United States Patent Office.

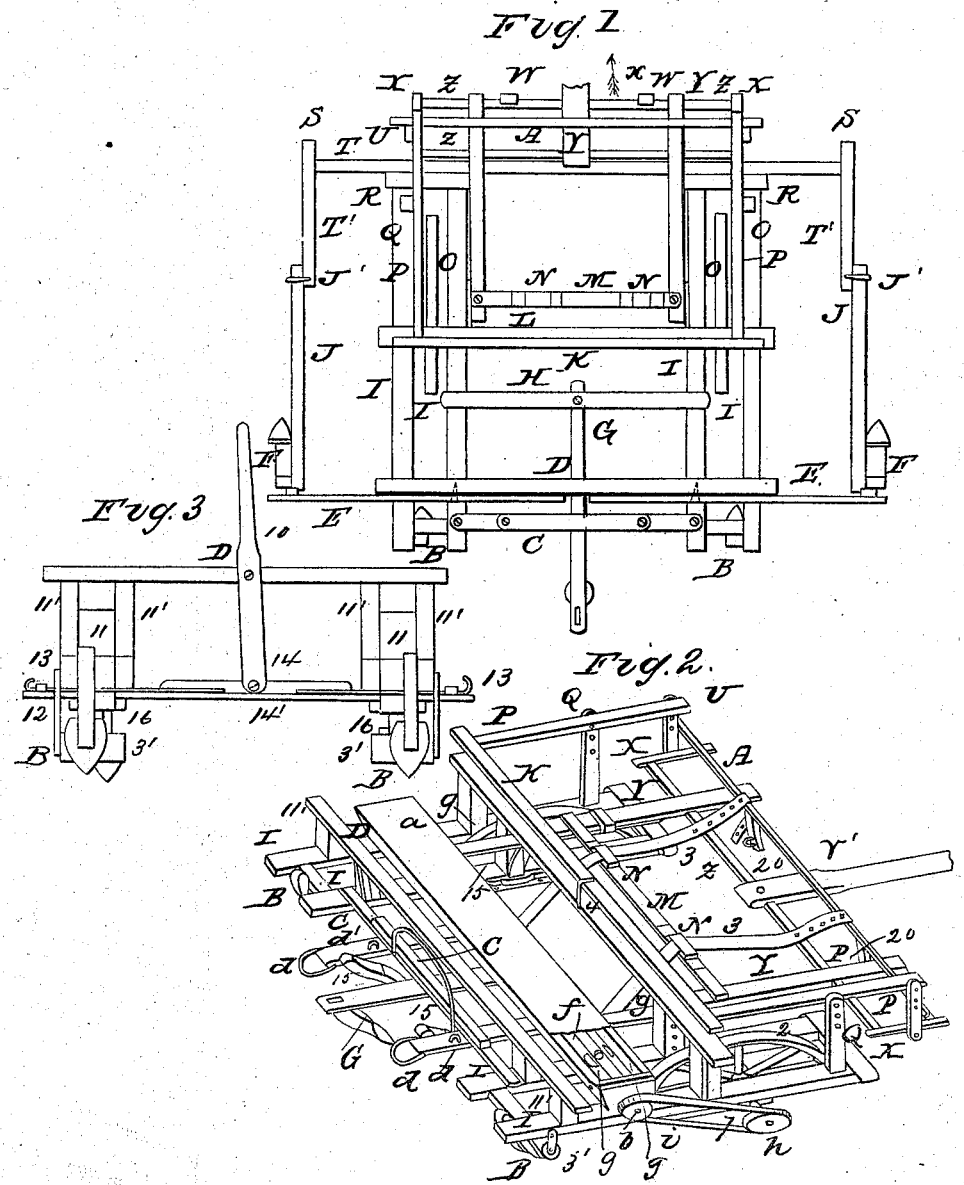

HENRY HAINES, OF CEDARVILLE, ILLINOIS.

Letters Patent No. 106,055, dated August 2, 1870.

IMPROVEMENT IN COMBINED SEEDER AND CULTIVATOR.

The Schedule referred to in these Letters Patent and making part of the same.

*To all whom it may concern:*

Be it known that I, HENRY HAINES, of Cedarville, in the county of Stephenson and State of Illinois, have invented a "Combined Seeder, Corn-Planter, Marker, and Cultivator;" and I do hereby declare that the following is a full and exact description thereof, which will enable those skilled in the art to make and use the same, reference being had to the accompanying drawing and letters marked thereon making a part of this specification, in which—

Figure 1 is a plan view of my invention, arranged for marking corn-ground, &c.

Figure 2, the same arranged for covering and seeding.

Figure 3, an end view of it as arranged for planting corn.

This invention relates to an improved agricultural implement, which is designed to mark corn-ground, plant and cultivate corn and similar crops, and sow seed, as the whole is hereinafter fully described.

I I represent a substantial frame, which is to be mounted on wheels 2, fig. 2, in the usual manner, for supporting similar devices, which carry a seeder, shovels, planter, &c., said wheels running between the frame-pieces I I, as shown in fig. 2.

When the device is used for marking corn-ground, a bar, T, is attached to its front part, as shown in plan view at fig. 1, said bar T having arms S T' attached, to which shovel-beams J, supporting shovels F, are pivoted at J' J'.

This arrangement is such that when the levers E, pivoted to the ends of the shovel-beams J and to an elevated frame-work, D, figs. 1 2, are forced down, the marking-shovels will be raised up or out of the ground, as the case may be, the operator thus being enabled to control the depth which the marking-shovels are to run in the ground, and also to raise them over obstacles.

The corn-planting device consists of two hoppers, 11, shown in fig. 3, which are placed and held between two upright standards, 11', figs. 2 3, and between the frame-pieces I I, and the arrangement is such that, when a lever, 10, pivoted to a frame-work, D, is moved to the right or left, the quantity of seed passing out of hoppers 11 will be controlled, by means of a cut-off 14', which is movable back and forth under the hoppers, and has the ordinary holes through it for the seed to pass through; shovels B, being attached to the frame I I in the usual manner, cover the corn as it is dropped.

When it is required to smooth or roll the ground after planting, removable rollers 3', hung by rods pivoted to the outer parts I, and shown more clearly in fig. 2, are made to operate between the dropping-pipes of hoppers 11 and the shovels B.

The seeding-box $a$ is shown in fig. 2, and it is made to operate by a belt, $i$, passing around a drive-wheel, $h$, and a pulley, $b$, driving the seeding-cylinder inside of the said box, the hoppers 11, marking and planting devices, being removed, and the shovels $d\ d$ G being attached, as shown in same figure, to a cross-piece, H, extending across the inner frame-pieces I I, shown more clearly in fig. 1, in order that the seed may be properly covered.

The seed-box $a$ has supports 9 9 fastened to the under side of a frame-work Y Y, pivoted to the inner sides of the inner frame-work, and to the outer frame-work I I are fastened standards Q Q, fig. 2, and to the tops of said standards are pivoted levers P, which, by means of a frame-work, Z X, are connected with the forward ends of the frame Y Y.

This arrangement is such that when a bar, K, attached to levers P, is brought down and hooked under a catch, 4, fig. 2, the whole rear part of the machine will be so raised up as to pass over obstacles, or move to or from fields.

For cultivating corn, the marking-shovels F, fig. 1, are to be removed, and the center shovel G also, and leather straps 3 3, fig. 2, attached to a cross-bar A, and fastened to catches $d'$ in the rear of plows $d$, and the forward ends of said plows attached to standards 20, extending down from frame Z X, the said straps being adjusted on bar A, so that the plows $d\ d$ may be made to run any required depth in the ground.

In the construction, a seat may be readily adjusted on the frame I I, so that the operator may have a convenient place to sit, similarly as he might have on other devices, there being room over the seed-box $a$.

Claims.

1. The combination of the removable rollers 3', hoppers 11, marking-shovels 15, and covering-shovels B, arranged to operate as and for the purpose specified.

2. The combination of the bar T, attached to front of frame I I, provided with arms S T', and marking-shovels F, having beams J pivoted to said arms at J', when operated with levers E to raise the shovels out of the ground, as specified.

3. The combination of the straps 3, cross-bar A, shovel-beams 9, and standards 20, constructed and arranged to operate as and for the purpose specified.

HENRY HAINES.

Witnesses:
A. W. TEMPLETON,
C. RICHART.